US009776799B2

(12) United States Patent
Ulchak et al.

(10) Patent No.: US 9,776,799 B2
(45) Date of Patent: Oct. 3, 2017

(54) CONVEYOR BELT SYSTEM WITH INTEGRATED SENSOR AND METHOD OF USING SAME

(71) Applicant: Cambridge International Inc., Cambridge, MD (US)

(72) Inventors: Jeffrey D. Ulchak, Salisbury, MD (US); Robert E. Maine, Jr., Salisbury, MD (US); Thomas O. Perdue, Salisbury, MD (US)

(73) Assignee: CAMBRIDGE INTERNATIONAL INC., Cambridge, MD (US)

(*) Notice: Subject to any disclaimer, the term of this patent is extended or adjusted under 35 U.S.C. 154(b) by 0 days.

(21) Appl. No.: 15/075,342

(22) Filed: Mar. 21, 2016

(65) Prior Publication Data
US 2016/0272429 A1 Sep. 22, 2016

Related U.S. Application Data

(60) Provisional application No. 62/135,347, filed on Mar. 19, 2015.

(51) Int. Cl.
*B65G 43/00* (2006.01)
*B65G 15/48* (2006.01)
(Continued)

(52) U.S. Cl.
CPC .......... *B65G 17/083* (2013.01); *B65G 17/08* (2013.01); *B65G 43/02* (2013.01);
(Continued)

(58) Field of Classification Search
CPC ......... B65G 43/00; B65G 15/48; B65G 17/06
(Continued)

(56) References Cited

U.S. PATENT DOCUMENTS

| 2,619,306 | A | | 11/1952 | Van Lake | |
|---|---|---|---|---|---|
| 4,030,595 | A | * | 6/1977 | McCombie | A24C 5/35 198/347.3 |
| 7,325,669 | B2 | * | 2/2008 | Frost | B65G 43/00 198/502.3 |
| 7,635,060 | B2 | * | 12/2009 | Lagneaux | B65G 17/086 198/810.04 |
| 8,397,904 | B2 | * | 3/2013 | Bogle | A23B 7/005 198/810.01 |
| 8,776,998 | B2 | * | 7/2014 | Weiser | B65G 17/08 198/850 |

(Continued)

FOREIGN PATENT DOCUMENTS

EP 2471727 A1 7/2012
WO 2007107022 A1 9/2007

(Continued)

OTHER PUBLICATIONS

Extended European Search Report mailed Jul. 28, 2016 in counterpart European Application No. 16161270.0 in the European Patent Office (9 pages).

*Primary Examiner* — Douglas Hess
(74) *Attorney, Agent, or Firm* — Buchanan Ingersoll & Rooney PC

(57) ABSTRACT

A conveyor belt system includes a conveyor belt and a sensor assembly integrated in the conveyor belt. The conveyor belt includes a plurality of wickets, and a plurality of interconnecting rods about which the wickets hinge. The sensor assembly includes a load-bearing member and a sensor fitted in the load-bearing member. The load-bearing member is coupled to two adjacent rods such that a belt tension is sustained between the adjacent rods. A method of using a conveyor belt system include pinging the sensor assembly using a reader with an antenna positioned on a conveyor frame, collecting a signal from the sensor assembly using the reader, and processing the collected data to determine a history of belt tension and to estimate overall belt elongation.

16 Claims, 5 Drawing Sheets

(51) Int. Cl.
*B65G 17/06* (2006.01)
*B65G 17/08* (2006.01)
*B65G 43/02* (2006.01)
*G06K 7/10* (2006.01)
*B65G 15/54* (2006.01)

(52) U.S. Cl.
CPC .......... *G06K 7/10445* (2013.01); *B65G 15/54* (2013.01); *B65G 2203/046* (2013.01)

(58) Field of Classification Search
USPC .... 198/810.01, 810.02, 810.03, 810.04, 850, 198/851, 852, 853
See application file for complete search history.

(56) References Cited

U.S. PATENT DOCUMENTS

| | | | |
|---|---|---|---|
| 8,939,280 B2 * | 1/2015 | Bogle | G01N 35/00009 198/497 |
| 9,132,960 B2 * | 9/2015 | Ragan | B65G 17/065 |
| 2007/0222612 A1 * | 9/2007 | Krisl | |
| 2011/0024269 A1 | 2/2011 | Wallace et al. | |

FOREIGN PATENT DOCUMENTS

| | | |
|---|---|---|
| WO | 2010049082 A1 | 5/2010 |
| WO | 2011046863 A1 | 4/2011 |

\* cited by examiner

CONVEYOR BELT SYSTEM WITH INTEGRATED SENSOR AND METHOD OF USING SAME

TECHNICAL FIELD

The disclosure herein relates to a conveyor belt system including an integrated sensor, a sensor that is integral within a conveyor belt, and a method of using the same. More particularly, the sensor includes a radio-frequency identification (RFID) sensor that measures and transmits strain within the conveyor belt.

BACKGROUND INFORMATION

RFID sensors are commonly used in various applications, including object tracking and providing unique identification. Typical applications include identification badges, toll collection and payment systems, building access control, and inventory and asset control. RFID sensors can be either active or passive. An active RFID system utilizes an onboard battery to transmit signals from the sensor to a reader according to a pre-determined rate or interval. Passive RFID sensors utilize the energy transmitted by an antenna on the reader to generate and signal a response from the sensor back to the reader as desired or requested. RFID technology can also be utilized in conjunction with a number of different sensors to measure and transmit data of various types such as, for example, temperature, pressure, and strain.

Metal conveyor belts, which are used in various process and transfer conveyor applications, are known for their durability and strength. For example, flatwire conveyor belts have been in the market for many years. Flatwire conveyor belts are generally low maintenance and, when positively driven with sprockets, exhibit little to no lateral shifting.

An example of a flatwire conveyor belt is disclosed in U.S. Pat. No. 2,619,306 and is illustrated in FIG. 1 of this application. FIG. 1 shows a flatwire conveyor belt 10 comprising a plurality of pickets 16, sometimes also referred to as wickets, and interconnecting rods 18 about which the pickets hinge. The pickets 16 on the belt 10 support the product to be conveyed, and the rods 18 are utilized to hold the components of the belt 10 together.

However, conveyor belts of this type may eventually fail due to a combination of tension and wear which cause elongation. Actual conveyor belt tension is difficult to accurately measure. Belt elongation values are more easily determined, but this requires routine involvement on the part of an operator or mechanic in order to make specific belt length measurements and subsequent adjustments to the conveyor and keep the belt running optimally. This task is typically not performed, however, which often leads to a shortened belt life and/or unexpected belt failures due to a lack of sufficient preventive maintenance. The result can include unexpected and/or excessive downtime.

Therefore, there is a need for a system that more easily provides elongation data, which can be used to determine the remaining useful belt service life.

SUMMARY

An exemplary conveyor belt system according to the disclosure herein comprises a conveyor belt, and a sensor assembly integrated in the conveyor belt. The conveyor belt comprises a plurality of wickets, and a plurality of interconnecting rods about which the wickets hinge. The sensor assembly comprises a load-bearing member and a sensor fitted in the load-bearing member. The load-bearing member is coupled to two adjacent rods such that a belt tension is sustained between the adjacent rods.

According to a further aspect of the disclosure, a sensor assembly configured to be integrated in a conveyor belt is disclosed. The conveyor belt comprises a plurality of wickets and a plurality of interconnecting rods about which the wickets hinge. The sensor assembly comprises a load-bearing member, and a sensor fitted in the load-bearing member. The load-bearing member is coupled to two adjacent rods of the conveyor belt such that a belt tension is sustained between the adjacent rods.

Another aspect of the disclosure includes a method of using a conveyor belt system. The conveyor belt system comprises a conveyor belt, and a sensor assembly integrated in the conveyor belt. The conveyor belt comprises a plurality of wickets, and a plurality of interconnecting rods about which the wickets hinge. The sensor assembly comprises a load-bearing member and a sensor fitted in the load-bearing member. The load-bearing member is coupled to two adjacent rods such that a belt tension is sustained between the adjacent rods. The method comprises pinging the sensor assembly using a reader with an antenna positioned on a conveyor frame, collecting a signal from the sensor assembly using the reader, and processing the collected data to determine a history of belt tension and to estimate overall belt elongation.

BRIEF DESCRIPTION OF THE DRAWINGS

Other features and advantages disclosed herein will become more apparent from the following detailed description of exemplary embodiments when read in conjunction with the attached drawings, wherein.

DETAILED DESCRIPTION

Conveyor belts, and in particular flat wire belts, are known in the industry. Examples are shown, for instance, in U.S. Pat. Nos. 5,934,448, 6,360,882, and 7,975,840 to the present assignee, and which are hereby incorporated by reference in this application.

Figure 1:
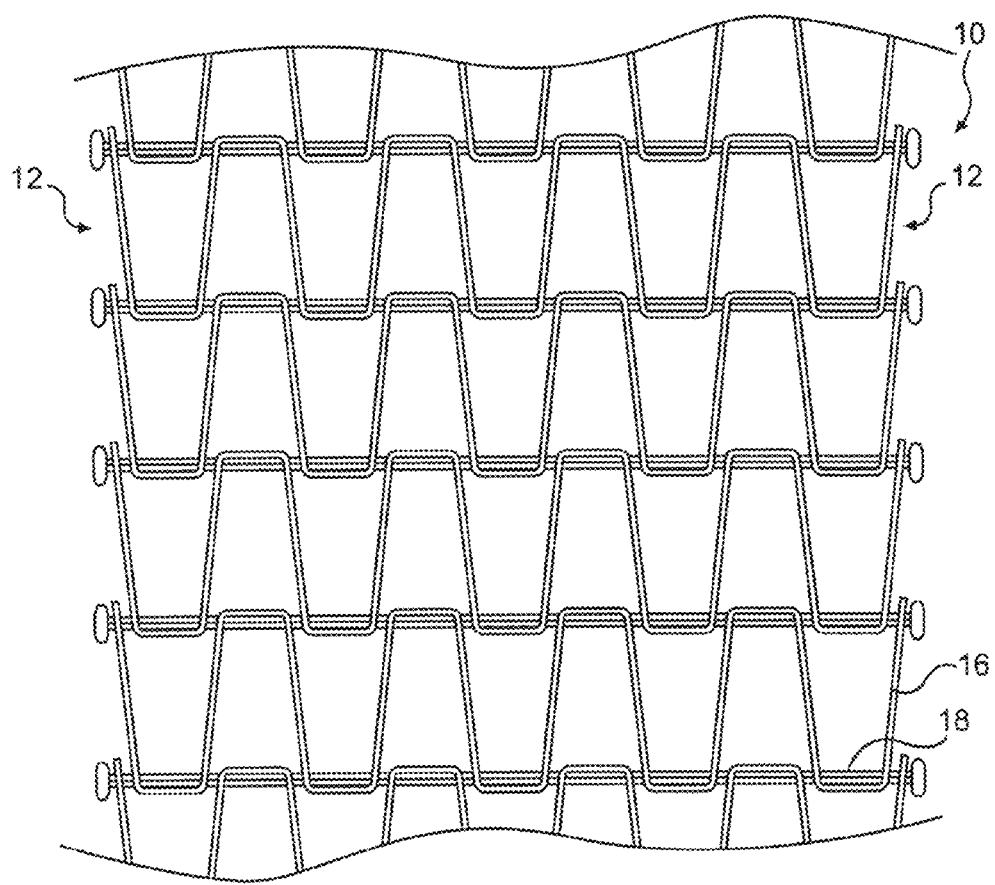
FIG. 1 is a top elevational view of a segment of a conventional flatwire conveyor belt.
Figure 2:
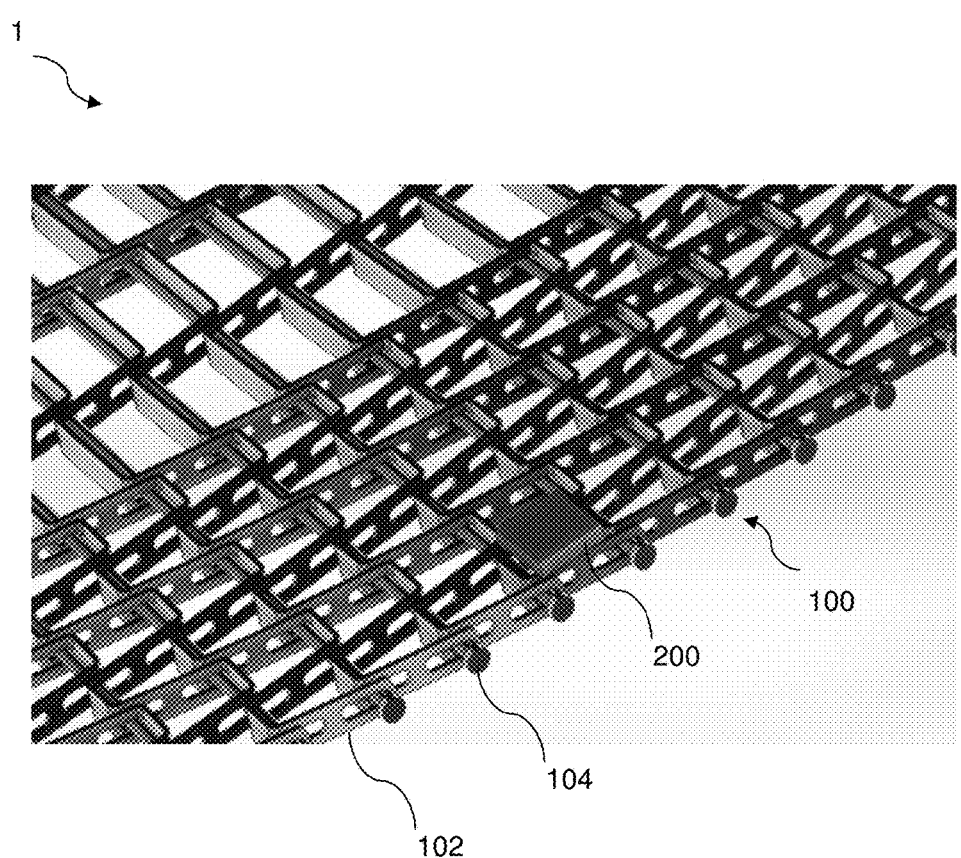
FIG. 2 is a schematic illustration of an illustrative embodiment of a conveyor belt system.
Figure 3:
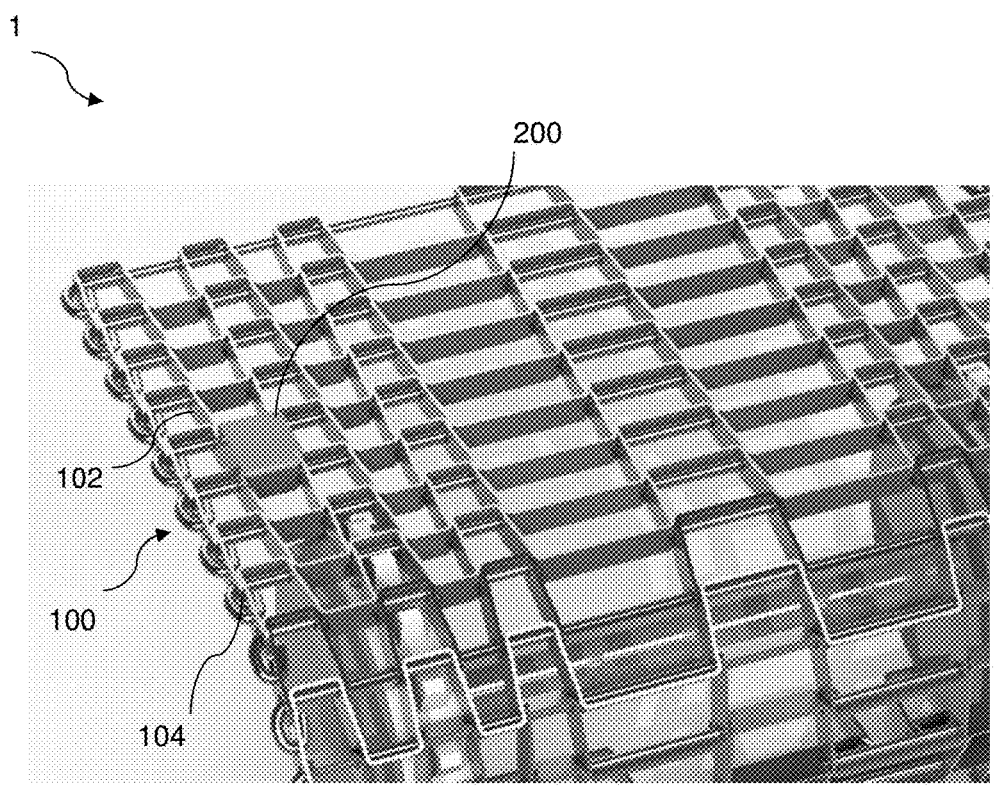
FIG. 3 is a schematic illustration of another illustrative embodiment of a conveyor belt system.
Figure 4:
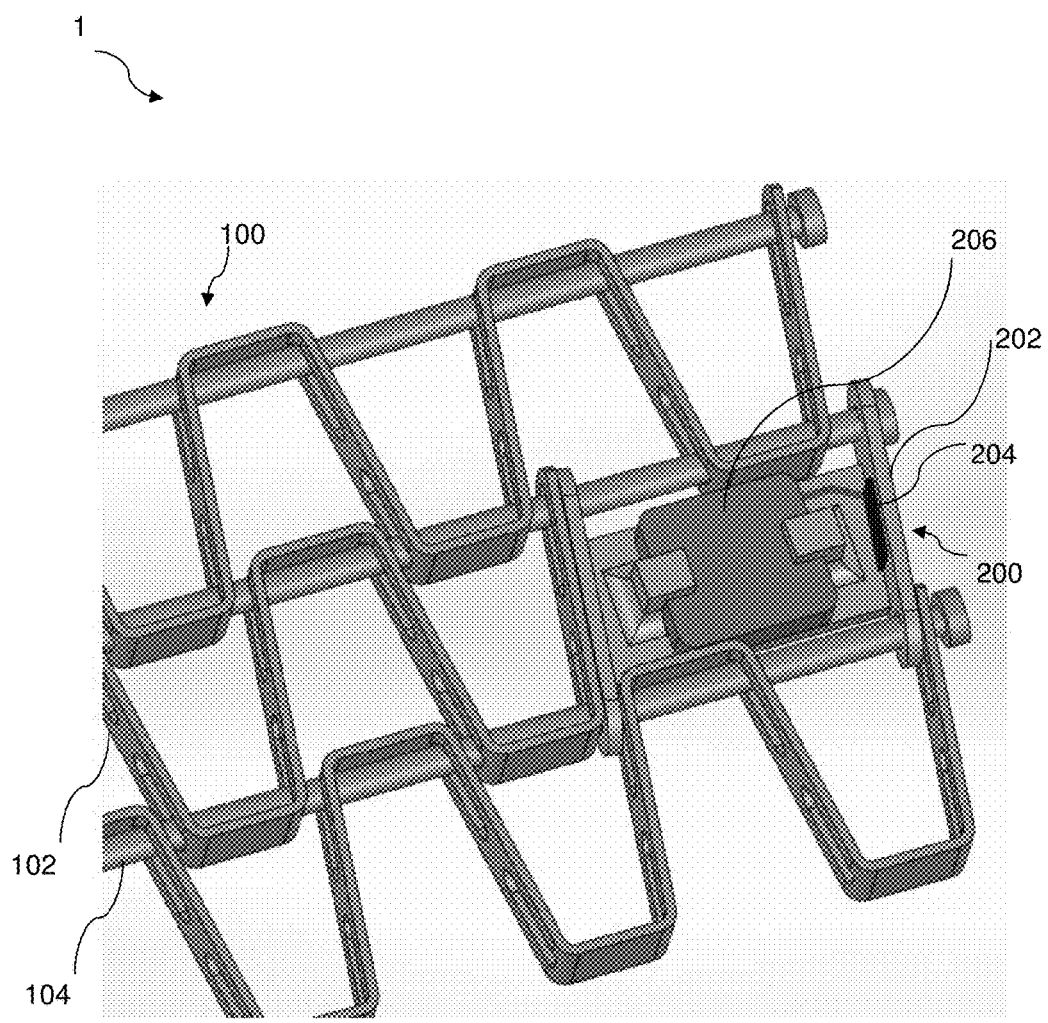
FIG. 4 is a schematic illustration of yet another illustrative embodiment of a conveyor belt system.

FIGS. 2-4 show schematic illustrations of illustrative embodiments of a conveyor belt system 1, which includes a conveyor belt 100 and a sensor assembly 200 integrated in the conveyor belt 100.

The conveyor belt 100 includes a plurality of wickets 102, and a plurality of interconnecting rods 104 about which the wickets 102 hinge. In an illustrative embodiment, the wickets 102 on the conveyor belt 100 are configured to support a product to be conveyed, and the rods 104 hold the components of the conveyor belt 100 together.

According to an illustrative embodiment, the sensor assembly 200 includes a load-bearing member 202 and a sensor 204 fitted in the load-bearing member. The load-bearing member 202 is coupled to two adjacent rods such that the belt tension is sustained between the adjacent rods.

The load-bearing member 202 is also configured to allow for proper belt articulation and engagement with sprockets.

The conveyor belt 100 is a preferably a metallic conveyor belt 100, although other materials could of course also be used. Further, while FIGS. 2-4 show a flatwire conveyor belt, variations of the disclosed sensor can be applicable to other types of belts used as conveyor belts or other applications of the belting, e.g., architectural mesh and the like.

As shown for example in FIG. 4, a portion of one or more belt pitches (links in the wicket) is replaced by a load-bearing component 202 capable of carrying the belt tension during service without compromising the structural integrity of the conveyor belt 100. That is, at least one wicket is configured to mount the sensor assembly therein.

The sensor assembly 200 further comprises an RFID device 206 connected to the sensor 204. The RFID device 206 is a passive RFID device according to an exemplary embodiment of the disclosure. The sensor 204 fitted in the load-bearing component 202 includes a strain-measuring sensor. In an illustrative embodiment, the sensor 204 also includes a temperature-measuring sensor.

Figure 5:
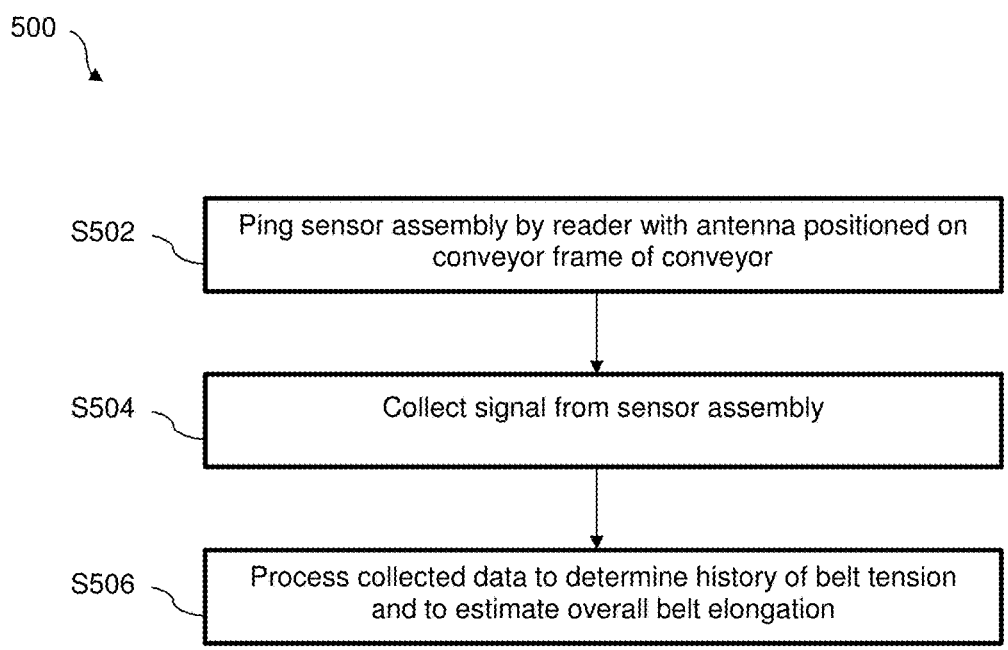
FIG. 5 is a schematic illustration of a method of using a conveyor belt system.

FIG. 5 shows a method 500 of using a conveyor belt system 1. The RFID device 206 of the sensor assembly 200 is pinged by a reader with an antenna positioned on a conveyor frame of the conveyor at step S502. The reader is configured to ping the RFID device 206 of the sensor assembly 200 to activate it.

The reader then collects a signal from the sensor assembly 200 when desired or per some pre-determined sampling rate, at step S504. When pinged, the sensor assembly 200 sends strain data to the reader. The sensor assembly 200 can also send temperature data to the reader. The reader generates time stamp data, and associates the time stamp data with data from the sensor.

The collected data can then be processed to determine a history of belt tension and to estimate overall belt elongation, at step S506. This can be performed by a processor in wired or wireless communication with the reader, which processes the collected data to determine a history of belt tension and to estimate overall belt elongation. Furthermore, as most strain sensors also include some degree of temperature compensation, a measurement of the temperature at which the conveyor is operating can also be transmitted as part of the data signal. In illustrative embodiments in which the sensor assembly 200 is passive, power to energize the sensor assembly 200 comes from the reader. This eliminates the need to replace batteries on the sensor assembly 200, which is integral to the conveyor belt 100.

In an illustrative embodiment, based on known mechanical characteristics of the conveyor belt 100, tension and elongation (due to wear and/or load) are calculated for each data point collected. The tension data can then be compared to known maximum load ratings for the conveyor belt 100 to determine if the conveyor belt 100 is being overloaded. Elongation data can be used to determine the remaining useful belt service life.

Once uploaded to a computer comprising a processor, the strain, temperature, and time stamp data can then be analyzed for unit trending. Abrupt changes in the belt tension may indicate a problem with the conveyor or a change in the operating conditions associated with the particular application. An examination and possible extrapolation of the belt elongation data can provide an indication of the future service life of the conveyor belt 100 along with a prediction of when the conveyor belt 100 may need to be replaced. This process can thus yield the information needed to schedule both the timely procurement of a replacement belt and the planned production line downtime necessary to complete that work.

The illustrative embodiments disclosed herein can therefore provide much needed benefits in numerous conveying applications which are not available from current product features, and can provide data that is not readily available otherwise.

It will be appreciated by those skilled in the art that the disclosure herein can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A conveyor belt system comprising:
   a conveyor belt; and
   a sensor assembly integrated in the conveyor belt;
   wherein the conveyor belt comprises a plurality of wickets, and a plurality of interconnecting rods about which the wickets hinge, at least one of said plurality of wickets being configured to mount said sensor assembly therein;
   wherein the sensor assembly comprises a load-bearing member, a sensor fitted in the load-bearing member, and an RFID device connected to the sensor, the load-bearing member being coupled to two adjacent rods such that a belt tension is sustained between the adjacent rods.

2. The conveyor belt system of claim 1, wherein the conveyor belt is a metallic conveyor belt.

3. The conveyor belt system of claim 1, wherein the RFID device is a passive RFID device.

4. The conveyor belt system of claim 1, wherein the sensor comprises a strain-measuring sensor.

5. The conveyor belt system of claim 4, wherein the sensor further comprises a temperature-measuring sensor.

6. A sensor assembly for use in a conveyor belt, the conveyor belt comprising a plurality of wickets and a plurality of interconnecting rods about which the wickets hinge, the sensor assembly comprising:
   a load-bearing member;
   a sensor fitted in the load-bearing member; and
   an RFID device connected to the sensor,
   wherein the load-bearing member is coupled to two adjacent rods of the conveyor belt such that a belt tension is sustained between the adjacent rods.

7. The sensor assembly of claim 6, wherein the sensor further comprises a temperature-measuring sensor.

8. The sensor assembly of claim 6, wherein the sensor assembly is configured to be integrated in a conveyor belt that is metallic.

9. The sensor assembly of claim 6, wherein the RFID device is a passive RFID device.

10. The sensor assembly of claim 6, wherein the sensor comprises a strain-measuring sensor.

11. The sensor assembly of claim 10, wherein the sensor further comprises a temperature-measuring sensor.

12. A method of using a conveyor belt system, the conveyor belt system comprising a conveyor belt, and a sensor assembly integrated in the conveyor belt, the conveyor belt comprising a plurality of wickets, and a plurality of interconnecting rods about which the wickets hinge, the sensor assembly comprising a load-bearing member and a sensor fitted in the load-bearing member, and the load-bearing member being coupled to two adjacent rods such that a belt tension is sustained between the adjacent rods,
the method comprising:
pinging the sensor assembly using a reader with an antenna positioned on a conveyor frame;
collecting a signal from the sensor assembly using the reader; and
processing the collected data to determine a history of belt tension and to estimate overall belt elongation.

13. The method of using a conveyor belt system of claim 12, wherein the conveyor belt is metallic.

14. The method of using a conveyor belt system of claim 12, wherein the sensor assembly further comprises an RFID device connected to the sensor, and the step of pinging the sensor comprises pinging the RFID device.

15. The method of using a conveyor belt system of claim 14, wherein the RFID device is a passive RFID device.

16. In a conveyor belt system comprising a conveyor belt including a plurality of wickets, and a plurality of interconnecting rods about which the wickets hinge, the improvement comprising:
at least one of said plurality of wickets being configured to mount a sensor assembly therein;
the sensor assembly comprising a load-bearing member, a sensor fitted in the load-bearing member, and an RFID device connected to the sensor.

* * * * *